US010091805B2

United States Patent
Lu et al.

(10) Patent No.: US 10,091,805 B2
(45) Date of Patent: Oct. 2, 2018

(54) METHOD IN A NETWORK AND NETWORK NODE FOR CO-SCHEDULING IN A NETWORK

(71) Applicant: Telefonaktiebolaget LM Ericsson (publ), Stockholm (SE)

(72) Inventors: Qianxi Lu, Beijing (CN); Qingyu Miao, Beijing (CN); Hai Wang, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 88 days.

(21) Appl. No.: 15/100,075

(22) PCT Filed: Nov. 29, 2013

(86) PCT No.: PCT/CN2013/088185
§ 371 (c)(1),
(2) Date: May 27, 2016

(87) PCT Pub. No.: WO2015/077990
PCT Pub. Date: Jun. 4, 2015

(65) Prior Publication Data
US 2017/0026990 A1 Jan. 26, 2017

(51) Int. Cl.
*H04L 5/14* (2006.01)
*H04W 72/12* (2009.01)
(Continued)

(52) U.S. Cl.
CPC ....... *H04W 72/1247* (2013.01); *H04W 72/04* (2013.01); *H04W 72/044* (2013.01); *H04W 72/048* (2013.01); *H04W 88/02* (2013.01)

(58) Field of Classification Search
CPC ............. H04W 72/04; H04W 72/0413; H04W 72/042; H04W 72/044; H04W 72/048; H04B 7/0452
(Continued)

(56) References Cited

U.S. PATENT DOCUMENTS 8,493,926 B2    7/2013  Beale et al.
2008/0188260 A1*  8/2008  Xiao ................... H04W 52/146
                                                                  455/522
(Continued)

FOREIGN PATENT DOCUMENTS

CN          102545977 A     7/2012
CN          102726111 A     10/2012
(Continued)

OTHER PUBLICATIONS

LTE; Evolved Universal Terrestrial Radio Access (E-UTRA); Requirements for support of radio resource management (3GPP TS 36.133 version 10.1.0 Release 10), Jan. 2011, pp. 19, 45, 84, 90.*

*Primary Examiner* — Andrew W Chriss
*Assistant Examiner* — Lalita W Pace
(74) *Attorney, Agent, or Firm* — Murphy, Bilak & Homiller, PLLC (57) ABSTRACT

The present invention relates to a method (S100) and wireless communication network node for co-scheduling a first and a second user equipments, UEs. The co-scheduling comprises scheduling the first UE and the second UE in a same time and frequency resource. The method comprises determining if a co-scheduling condition is fulfilled, wherein the co-scheduling threshold value, selecting the first and second UE for co-scheduling when the co-scheduling condition is fulfilled.

14 Claims, 8 Drawing Sheets

(51) Int. Cl.
*H04W 72/04* (2009.01)
*H04W 88/02* (2009.01)

(58) Field of Classification Search
USPC .......................................................... 370/329
See application file for complete search history.

(56) References Cited

U.S. PATENT DOCUMENTS

2010/0265904 A1* 10/2010 Yang .................... H04J 11/0053
370/329
2013/0194984 A1* 8/2013 Cheng ................. H04W 72/082
370/294

FOREIGN PATENT DOCUMENTS

| CN | 102905378 A | 1/2013 | |
|---|---|---|---|
| WO | 2011055137 A1 | 5/2011 | |
| WO | 2012065278 A1 | 5/2012 | |
| WO | WO 2012065278 A1 * | 5/2012 | ........... H04B 7/0452 |
| WO | 2013004283 A1 | 1/2013 | |

\* cited by examiner

METHOD IN A NETWORK AND NETWORK NODE FOR CO-SCHEDULING IN A NETWORK

TECHNICAL FIELD

The present technology relates to a method and a node in a wireless communication network.

BACKGROUND

A basic precept of wireless communication is that a radio cannot transmit and receive on the same frequency at the same time, i.e. operate in a co-frequency/time full duplex fashion. The signal from a local transmitting antenna is much stronger than transmissions from other nodes, which has been attenuated by the propagation loss. Hence it has been generally assumed that one cannot decode a received signal at a radio while it is simultaneously transmitting.

To achieve send and receive data in a co-frequency and co-time way, under the current cellular system assumption, the required interference cancellation capability has to be 130~140 dB. Externally and internally, now 80 dB interference cancellation can be achieved.

To enhance the interference cancellation capability, some aspects can be considered, where different implementation complexity can be observed for base station and user equipment's.

- To increase the loss provided at antenna, geographically separated transmitter and receiver antennas can reduce the interference received at the receiver port largely. It is easier to implement at base station (BS) side, considering the smaller size of the user equipment, UE.
- To deal with the interference, the cancellation algorithm has to track Doppler and multi-path effect perfectly. Due to this, a fixed side BS would experience a more stable environment, and would be less affected by mobility, e.g. at UE side.

So to benefit from full duplex scheme, while not imposing too much complexity at UE side, the full duplex interference cancellation can be applied only at BS side, while two different UEs are scheduled for the downlink (DL) and uplink (UL) direction. And the problem is converted to how to avoid the UE to UE interference in this case.

Considering a co-frequency/time full duplex scheduling in a single cell, the harmful interference is in two aspects:

1) the self-interference from BS transmit antenna to BS receive antenna; and
2) the UE to UE interference from UL UE to DL UE.

In the international patent application WO 2013/004283 it is presented a straightforward UE-to-UE measurement to get UE-UE link loss information. However, legacy UEs are not configured to perform direct UE to UE measurement

SUMMARY

An object of the following disclosure is to provide solutions for enabling co-scheduling of a first and a second user equipments, when the problem is that not straightforward UE-to-UE measurement to get UE-UE link loss information is available.

According to an aspect, the object is achieved by means of a method, and embodiments thereof, for co-scheduling a first and a second user equipments, UE. Co-scheduling comprises scheduling the first UE and the second UE in a same time and frequency resource. The method is performed in a network node that is configured to serve the first and second UE. The method comprises determining an uplink, UL, transmitting power value for the first UE and a downlink, DL, receiving power value for the second UE, and determining a link loss information, between the first and second UEs, said link loss information being determined based on channel measurement results between the first UE and the network node, and the second UE and the network node. The method further comprises deriving a co-scheduling threshold value based on the UL transmitting power value for the first UE and DL receiving power value for the second UE, and determining if a co-scheduling condition is fulfilled, wherein the co-scheduling condition implies comparing the link loss information to the co-scheduling threshold value. The method involves selecting the first and second UE for co-scheduling when the co-scheduling condition is fulfilled.

According to another aspect, the object is achieved by means of a network node of a wireless communications network. The network node is configured to serve a first and a second user equipment, UE, and to provide co-scheduling of the first and the second user equipment, wherein co-scheduling comprises scheduling the first UE and the second UE in a same time and frequency resource. The network node comprises processing circuitry operative of determining an uplink, UL, transmitting power value for the first UE and a downlink, DL, receiving power value for the second UE, and determining link loss information between the first and second UEs. The processing circuitry is further operative of deriving a co-scheduling threshold value based on the UL transmitting power value for the first UE and DL receiving power value for the second UE, and of determining if a co-scheduling condition is fulfilled, wherein the co-scheduling condition implies comparing the link loss information to the co-scheduling threshold value. The processing circuitry is further operative of selecting the first and second UE for co-scheduling when the co-scheduling condition is fulfilled.

The processing circuitry may be implemented by a processor and a memory, wherein said memory is containing instructions executable by said processor.

Different embodiments of the above aspects are stated in the enclosed dependent claims.

One advantage with the provided methods and node solutions herein is that link loss information is derived at the network node side only, which only will have an influence of the complexity of the base station side, and not the complexity of the UE side.

BRIEF DESCRIPTION OF THE DRAWINGS

The foregoing, and other, objects, features and advantages of the present invention will be more readily understood upon reading the following detailed description in conjunction with the drawings in which.

DETAILED DESCRIPTION

In the following description, for purposes of explanation and not limitation, specific details are set forth, such as particular circuits, circuit components, techniques, etc. in order to provide a thorough understanding of the present invention. However, it will be apparent to one skilled in the art that the present technique may be practiced in other embodiments that depart from these specific details. In other instances, detailed descriptions of well-known methods, devices, and circuits are omitted so as not to obscure the description of the present technique with unnecessary detail.

In the following description, network node is meant to refer to a node in a wireless communication network, such as a base station, NodeB, eNB, etc.

Figure 1:
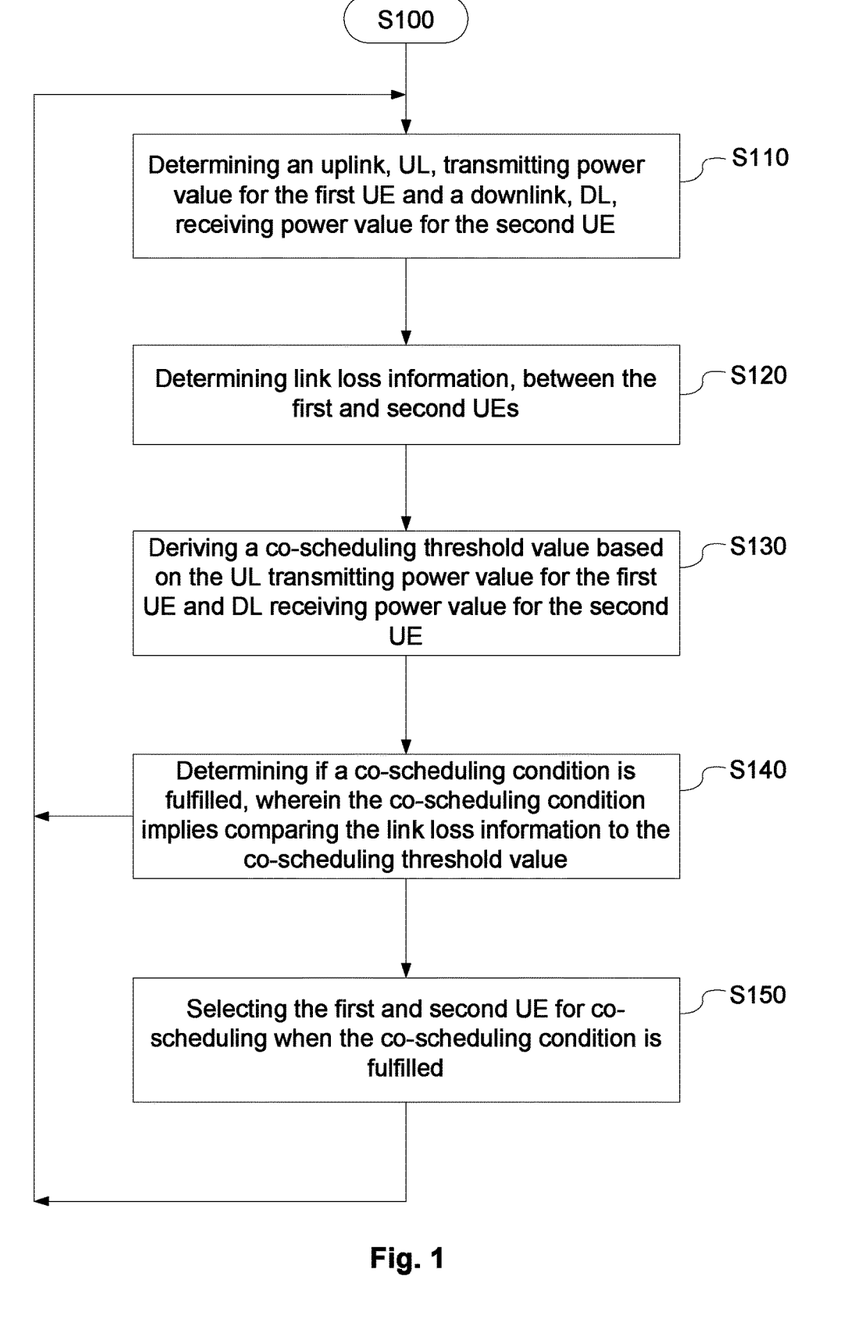
FIG. 1 is a flowchart of a method for co-scheduling a first and a second user equipments.

FIG. 1 is a flowchart of a method for co-scheduling a first and a second user equipment, UE, wherein co-scheduling comprises scheduling the first UE and the second UE in a same time and frequency resource over the air interface between a network node and a UE, the method being performed in a network node being configured to serve the first and second UE.

The method comprises:

S110: Determining an uplink, UL, transmitting power value for the first UE and a downlink, DL, receiving power value for the second UE.

Different ways of determining the uplink, UL, transmitting power value for the first UE and a downlink, DL, receiving power value for the second UE are possible.

There are different ways to get the information to be able to determine the UL transmitting power of the first UE, and DL receiving power of the second UE.

According to one example, the determining of UL transmitting power value for the first UE and DL receiving power value for the second UE are retrieved from Layer 1/Radio Resource Management (L1/RRM) measurement result(s) reported by the first and second UEs. An eNB is a logical network node comprising the RRM functionality. The RRM requirements are divided into enhanced support for end-to-end QoS, efficient support for transmission of higher layers, and support of load sharing and policy management across different radio access technologies.

According to another example, the determining of UL transmitting power value for the first UE comprises may be performed by retrieving UL transmitting power value from a power headroom report (PHR). It can be combined with the power control command sent from the network to UEs.

The DL receiving power of the second UE may be retrieved from different measurement reports, e.g. any of a Reference Signal Received Power (RSRP), Reference Signal Received Quality (RSRQ), or Channel-Quality Indicator (CQI) measurement report. The RSRP only contains the signal power of the serving cell. RSRQ, CQI contains the inter-cell interference effect as well.

The method further comprises:

S120: Determining link loss information, between the first and second UEs, said link loss information being determined based on channel measurement results between the first UE and the network node, and the second UE and the network node.

The link loss information is a value that may be determined from collected location information and/or channel information for the first UE and second UE, respectively.

The link loss information comprises location data for the first and second UE. Said location data for the first and/or second UE is/are derived from measurement(s) on the link between the network node and the UE in question. Different ways of determining said information is described hereafter in connection with the description of different embodiments of the method.

The method further comprises:

S130: Deriving a co-scheduling threshold value based on the UL transmitting power value for the first UE and DL receiving power value for the second UE.

The co-scheduling threshold value is a distance and/or link loss threshold value that is derived from the uplink, UL, transmitting power value for the first UE and the downlink, DL, receiving power value for the second UE. Said values were determined in step S110. The result of the derivation, or calculation, may be summarized as a function of the uplink, UL, transmitting power value for the first UE and the downlink, DL, receiving power value for the second UE.

A simple example is as follows, where the SINR target and noise power are both for the DL Rx UE, the function F is the inverse function of the path loss model:

$$\text{Threshold} = F\left(\frac{Tx \text{ power of the } UL \text{ } Tx \text{ } UE}{\frac{Rx \text{ power of the } DL \text{ } Rx \text{ } UE}{SINR \text{ target of the } DL \text{ } Rx \text{ } UE} - \text{Noise power}}\right),$$

wherein Tx stands for "transmit", Rx stands for "receive" and SINR stands for signal-to-interference-plus-noise ratio. Noise power depends on the electromagnetic characteristic of receiver, so it can be basically seen as some predetermined 'constant'.

Combined with the location/channel info between UEs, it is possible in the node of the wireless communication network to estimate the receiving SINR at DL UE side, i.e., whether co-scheduling is feasible. In said node, the scheduler can perform this estimation.

The trigger of RSRP (and RSRQ) can be configured to a threshold value where co-scheduling is feasible, e.g., −70~−80 dBm.

The method further comprises:

S140: Determining if a co-scheduling condition is fulfilled, wherein the co-scheduling condition implies comparing the link loss information to the co-scheduling threshold value.

The condition is preferably stated in such a way that when the condition is fulfilled, the co-scheduling of the first UE in uplink and the second UE in downlink is feasible. The co-scheduling condition may be defined in different ways, which also will be described in different examples in connection with the method.

The method further comprises:

S150: Selecting the first and second UE for co-scheduling when the co-scheduling condition is fulfilled.

As mentioned above, the link loss information is a value that may be determined from collected location information and/or channel information for the first UE and second UE, respectively.

So for a full duplex scheduler, when a DL user and a UL user are to be co-scheduled, a distance threshold can be used as a constraint. I.e., if the inter-user distance is less than the threshold, the co-scheduling would not be allowed. In this way, the inter-user propagation loss can be ensured to be large enough.

The link loss information is a value that may be determined from collected location information the network can get the information of UE location by means of that has been introduced into LTE. Said positioning mechanisms were released in Rel-9 of the LTE standard and involves:

A-GPS (Advanced Global Positioning System);
enhanced cell ID (Identity);
OTDOA (Observed Time Difference Of Arrival).

Figure 2A:
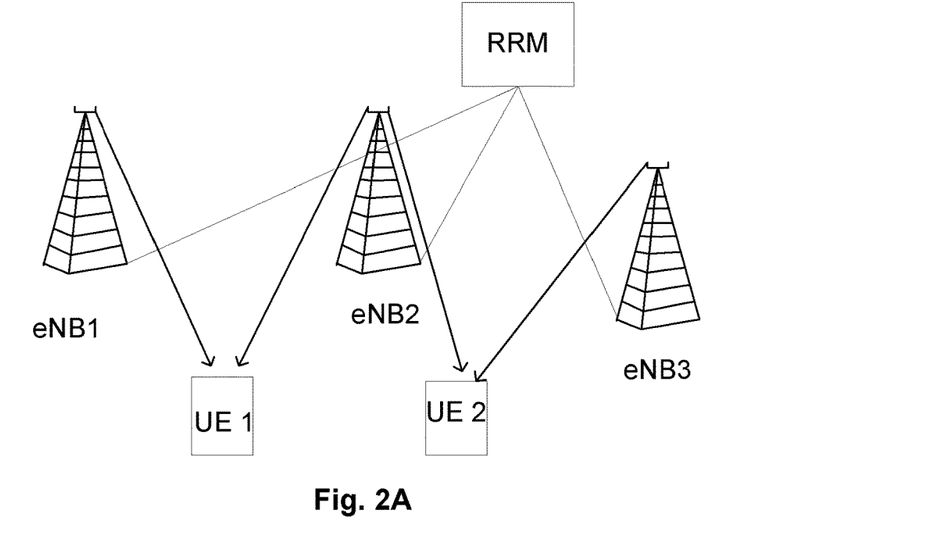
FIG. 2A is a block diagram illustrating a wireless communication network and user equipments having different positions to be determined.
Figure 2B:
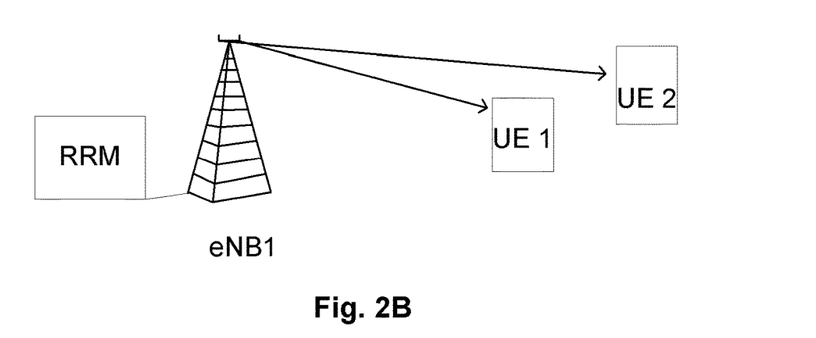
FIG. 2B is a block diagram illustrating a wireless communication network and user equipments having different positions to be determined.
Figure 2C:
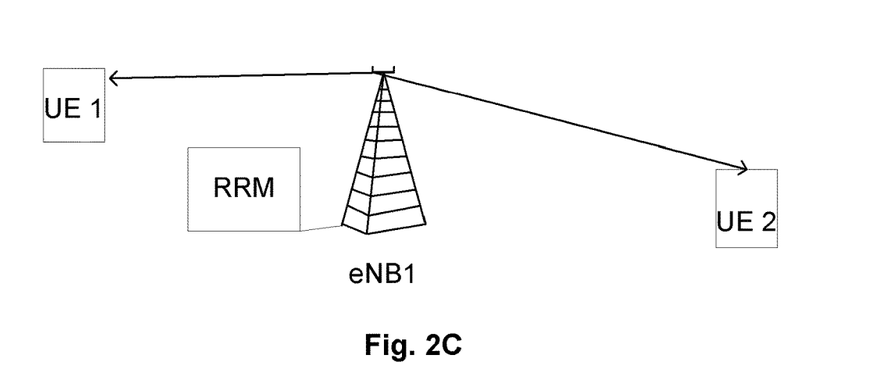
FIG. 2C is a block diagram illustrating a wireless communication network and user equipments having different positions to be determined.

The link loss information is a value that may be determined from collected channel loss based on UE from/to network node measurement, e.g. UE-eNB node measurement. FIGS. 2A, 2B and 2C are schematically illustrating different methods for UE-eNB node measurement.

The signal from/to wireless communications network node eNB can act as a reference to decide UE position. By analysing/comparing measurement on UE to eNB link, the relative UE position relationship can be derived as well.

In FIG. 2A, three eNBs, eNB 1, eNB 2 and eNB 3 are signalling with two UEs, UE 1 and UE 2. Based on the eNB DL signal, the UEs can get RSRP/RSRQ measurement results, which would be then reported to the eNB. Based on this type of results, eNB can derive the UE position. As shown in FIG. 2A, UE 1 observes larger RSRP of eNB 1 than eNB 3, but UE 2 observes larger RSRP eNB 3 than eNB 1. The network node eNB configured to compare the RSRP measurement results received from the UEs to the co-scheduling threshold and if the co-scheduling condition is fulfilled, the i.e. the two UEs are far enough away from each other, the two UEs are selected for co-scheduling. This decision/comparison functionality could be located in eNB together with the scheduling functionality (e.g., eNB 2 can do this decision/comparison if it is the serving eNB for UE 1 and UE 2).

FIG. 2B is illustrating two UEs, UE 1 and UE 2, signalling with a wireless communications network node eNB. Based on the UEs UL signals, the eNB can measure and get Timing Advance, TA, results. A continually adjusted TA value avoids interference to and from other users in adjacent timeslots, thereby minimizing data loss and maintaining Mobile QoS (quality-of-service). TA is significant for privacy and communications security, as its combination with other variables can allow GSM (Global System for Mobile communications) localization to find the device's position and tracking the mobile phone user. TA is also used to adjust transmission power in Space-division multiple access systems.

Based on this type of results, eNB can derive the UE position as well. As shown in FIG. 2B, if UE 1 TA value is much larger than UE 2, it can be decided that the UE 1 is far from eNB but UE 2 is close to the eNB, so the two UEs are far away from each other. The RRM in the wireless communications network node is configured to compare the TA measurement results received from the UEs to the co-scheduling threshold and if the co-scheduling condition is fulfilled, the i.e. the two UEs are far enough away from each other, the two UEs are selected for co-scheduling.

FIG. 2C is illustrating two UEs, UE 1 and UE 2, signalling with a wireless communications network node eNB (as in FIG. 2B). Based on the UEs UL signals, the wireless communications network node eNB comprising an RRM can measure and get Direction of Arrival, DoA, results. Based on this type of results, the eNB can derive the UE positions as well.

An example is illustrated in FIG. 2C. The measured DoA values are measured. The RRM in the wireless communications network node is configured to compare the DoA measurement results to the co-scheduling threshold and if the co-scheduling condition is fulfilled, the i.e. the two UEs are far enough away from each other, the two UEs are selected for co-scheduling. In this case, the DoA values of UE 1 and UE 2 are much different from each other, due to the UEs positions relatively the eNB. The DoA measurement results are compared to the co-scheduling threshold and if the co-scheduling condition is fulfilled, the two UEs could be selected for co-scheduling. In conclusion, this type of measurement can be used to get relative position relationship between the two UEs, which is although not accurate enough, but still can act as the input of scheduler to decide whether to co-schedule the UEs.

Figure 3:
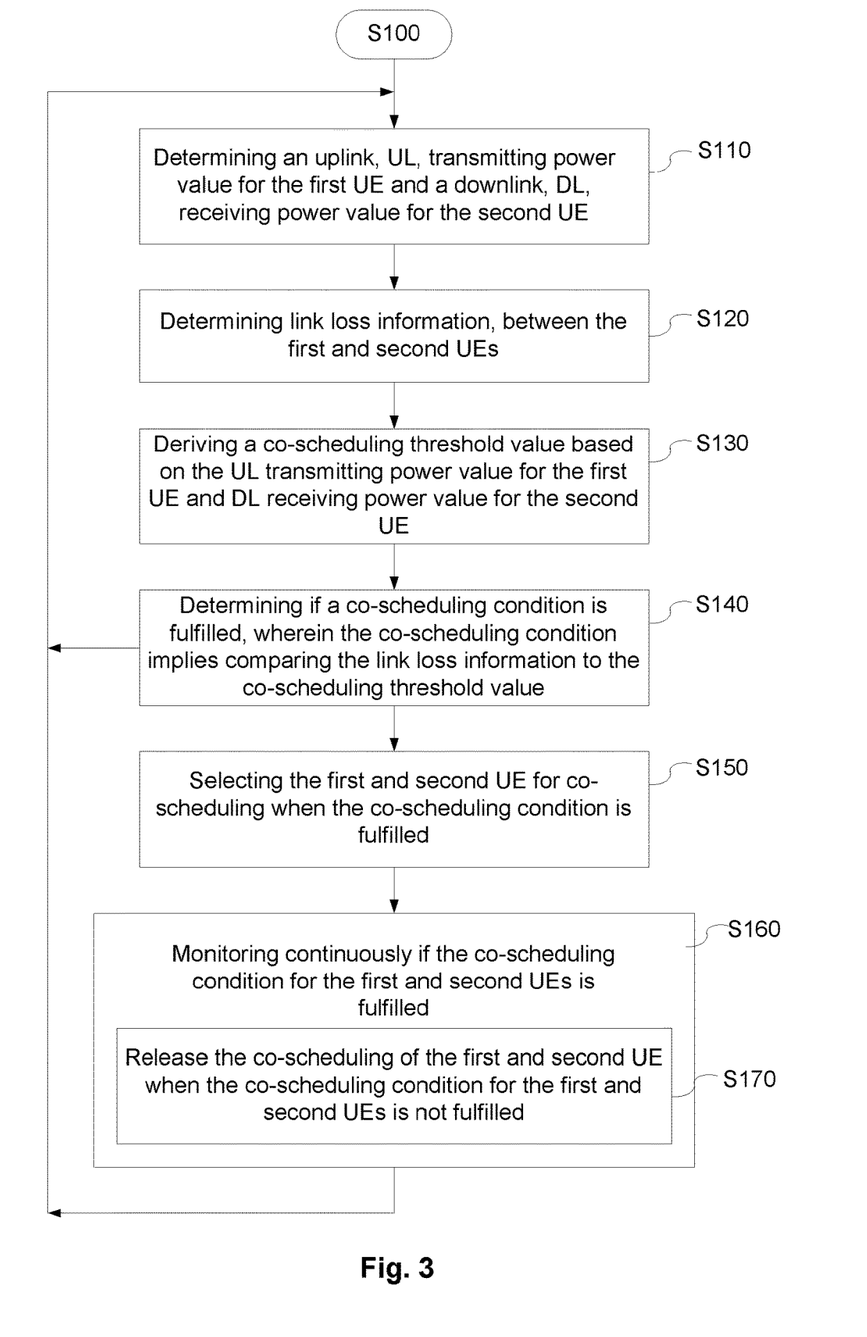
FIG. 3 is a flowchart illustrating an embodiment of the method for co-scheduling a first and a second user equipments, UEs.

FIG. 3 is a flowchart illustrating an embodiment of the method for co-scheduling a first and a second user equipments, UEs. This method further involves steps for releasing the co-scheduling of the two UEs.

The method comprises:

S160: Monitoring continuously if the co-scheduling condition for the first and second UEs is fulfilled. Step S160 is a sub-process of the method wherein continuous monitoring of the co-scheduling condition is performed. It could be considered as a state of the method. The method may be configured to stay in this sub-process, or state, until the condition for the first and second UEs is not fulfilled. When that condition occurs, the method forwards to step S170.

S170: Release the co-scheduling of the first and second UE when the co-scheduling condition for the first and second UEs is not fulfilled. When the co-scheduling condition for the first and second UEs is not fulfilled, the method goes to step S110, for restarting the process for co-scheduling a first and a second UEs.

Figure 4:
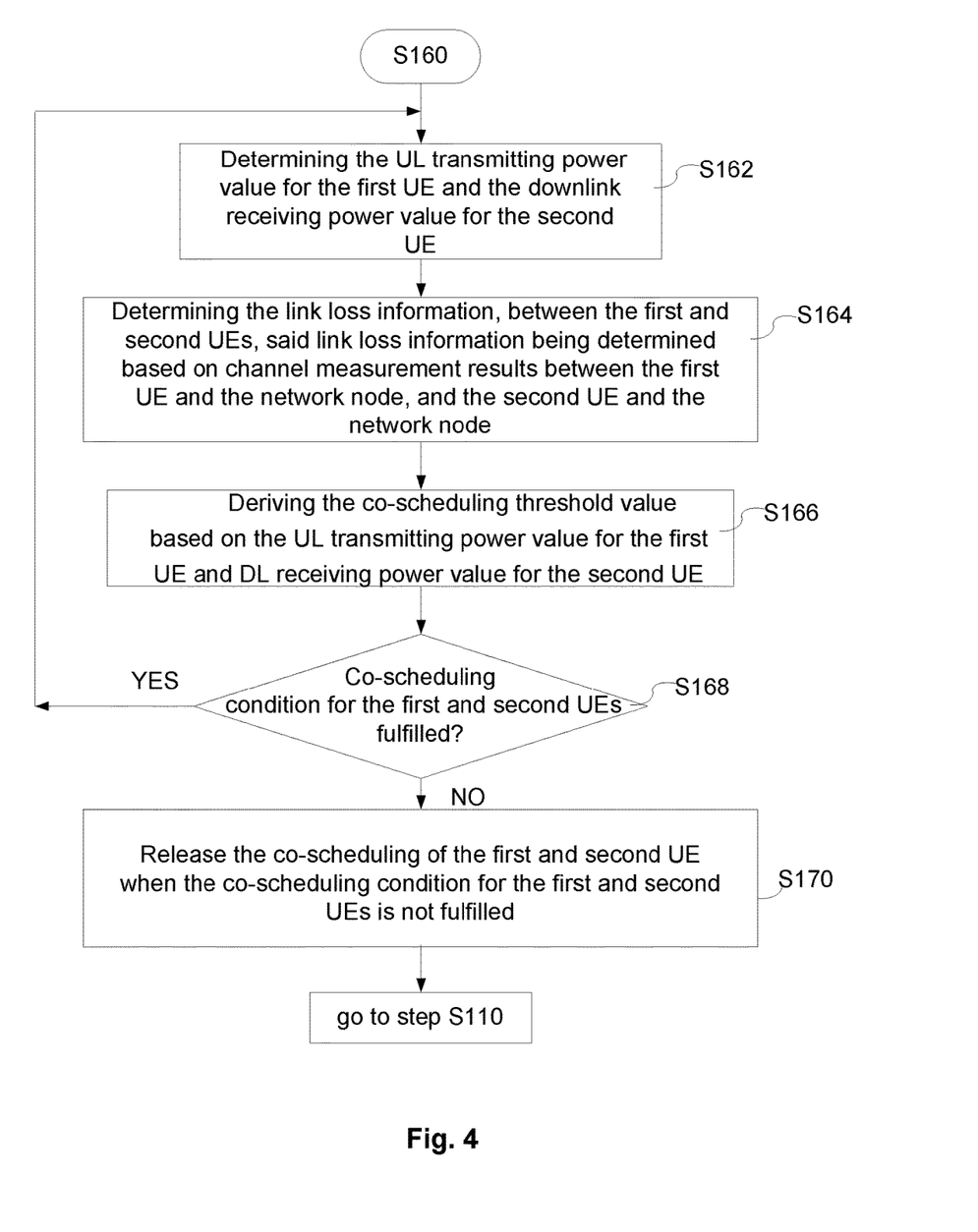
FIG. 4 is a flowchart of the method in which an example of step S160 is illustrated in more detail.

FIG. 4 is a flowchart of the method in which an example of step S160 is illustrated in more detail.

Step S160 is a sub-process of the method wherein continuous monitoring of the co-scheduling condition is performed. Said step S160 may involve:

S162: Determining the UL transmitting power value for the first UE and the downlink receiving power value for the second UE. This step corresponds to the step S110 as described above in connection with FIG. 1;

S164: Determining the link loss information, between the first and second UEs, said link loss information being determined based on channel measurement results between the first UE and the network node, and the second UE and the network node. This step corresponds to the step S120 as described above in connection with FIG. 1;

S166: Deriving the co-scheduling threshold value based on the UL transmitting power value for the first UE and DL receiving power value for the second UE. This step corresponds to the step S130 as described above in connection with FIG. 1;

S168: Co-scheduling condition for the first and second UEs fulfilled? In this step it is tested if the Co-scheduling condition is fulfilled, or not. If the condition is fulfilled, the method goes to step S110. When the condition is not fulfilled, step S170 is performed:

S170: Release the co-scheduling of the first and second UE when the co-scheduling condition for the first and second UEs is not fulfilled. When the co-scheduling condition for the first and second UEs is not fulfilled, the method goes to step S110, for restarting the process for co-scheduling a first and a second UEs.

Figure 5:
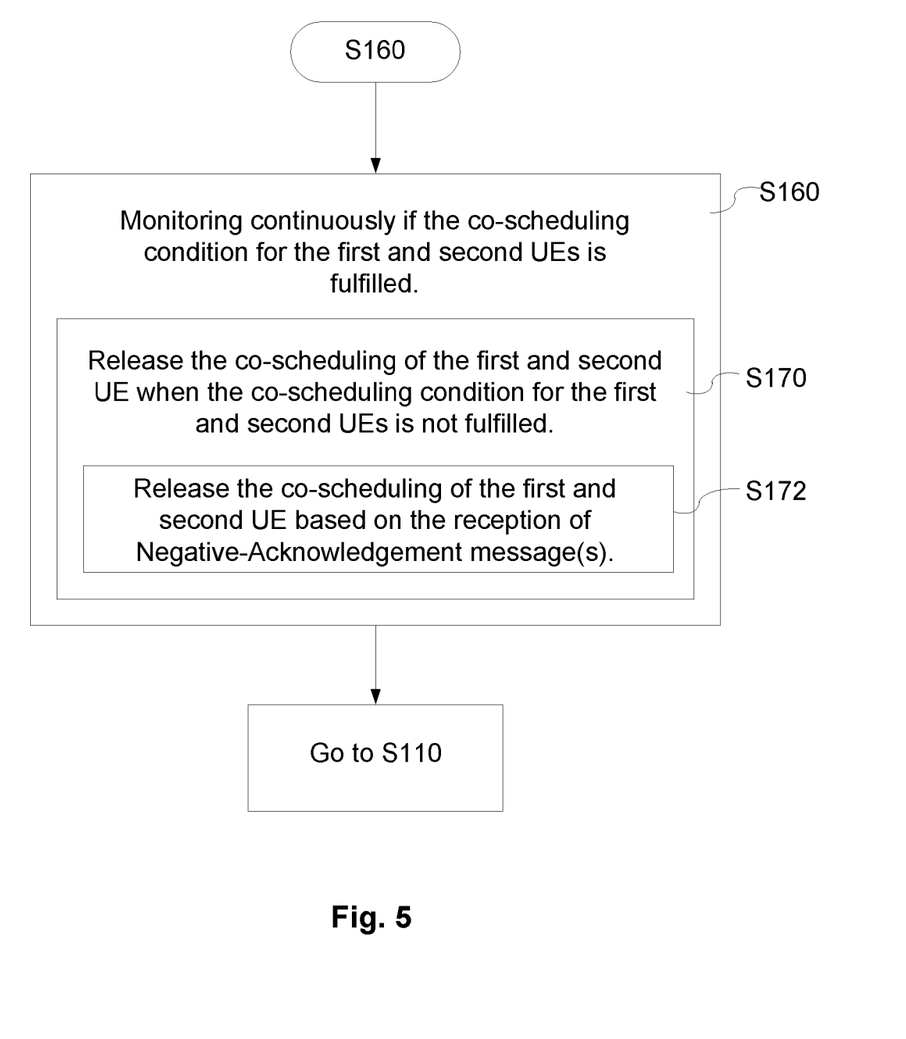
FIG. 5 is a flowchart of another embodiment of the method in which another example of step S160 is illustrated in more detail.

FIG. 5 is a flowchart of another embodiment of the method in which another example of step S160 is illustrated in more detail. According to this embodiment, two different release criteria may be used in combination for releasing the co-scheduling of the first and second UEs. The first criterion is tested as in step:

S170: Release the co-scheduling of the first and second UE when the co-scheduling condition for the first and second UEs is not fulfilled. When the co-scheduling condition for the first and second UEs is not fulfilled, the method goes to step S110, for restarting the process for co-scheduling a first and a second UEs.

A second criterion may be based on the reception of Negative-Acknowledgement message(s) in the wireless node.

A second criterion is therefore tested as:

S172: Release the co-scheduling of the first and second UE based on the reception of Negative-Acknowledgement message(s). If the two UEs are close to each other, there will be large interference for the reception of DL users when the UL users are scheduled, which would cause Negative-Acknowledgement (NACK) in Medium Access Control (MAC), Radio Link Control (RLC), Transport Control Protocol (TCP) layer, including the Radio Link Failure (RLF) event.

If one or both of these two release criteria are fulfilled, the co-scheduling of the first and second UEs is released.

When the first and second UE has been released, the method returns to step S110.

The present technique may be implemented in digital electronically circuitry, or in computer hardware, firmware, software, or in combinations of them. Apparatus may be implemented in a computer program product tangibly embodied in a machine readable storage device for execution by a programmable processor; and method steps of the invention may be performed by a programmable processor executing a program of instructions to perform functions of the invention by operating on input data and generating output.

The present technique may advantageously be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language.

Generally, a processor will receive instructions and data from a read-only memory and/or a random access memory. Storage devices suitable for tangibly embodying computer program instructions and data include all forms of non-volatile memory, including by way of example semiconductor memory devices, such as EPROM (erasable programmable read only memory), EEPROM (electrically erasable programmable read only memory), and flash memory devices; magnetic disks such internal hard disks and removable disks; magneto-optical disks; and CD-ROM (Compact Disc Read-Only Memory) disks. Any of the foregoing may be supplemented by, or incorporated in, specially designed ASICs (Application Specific Integrated Circuits).

Figure 6:
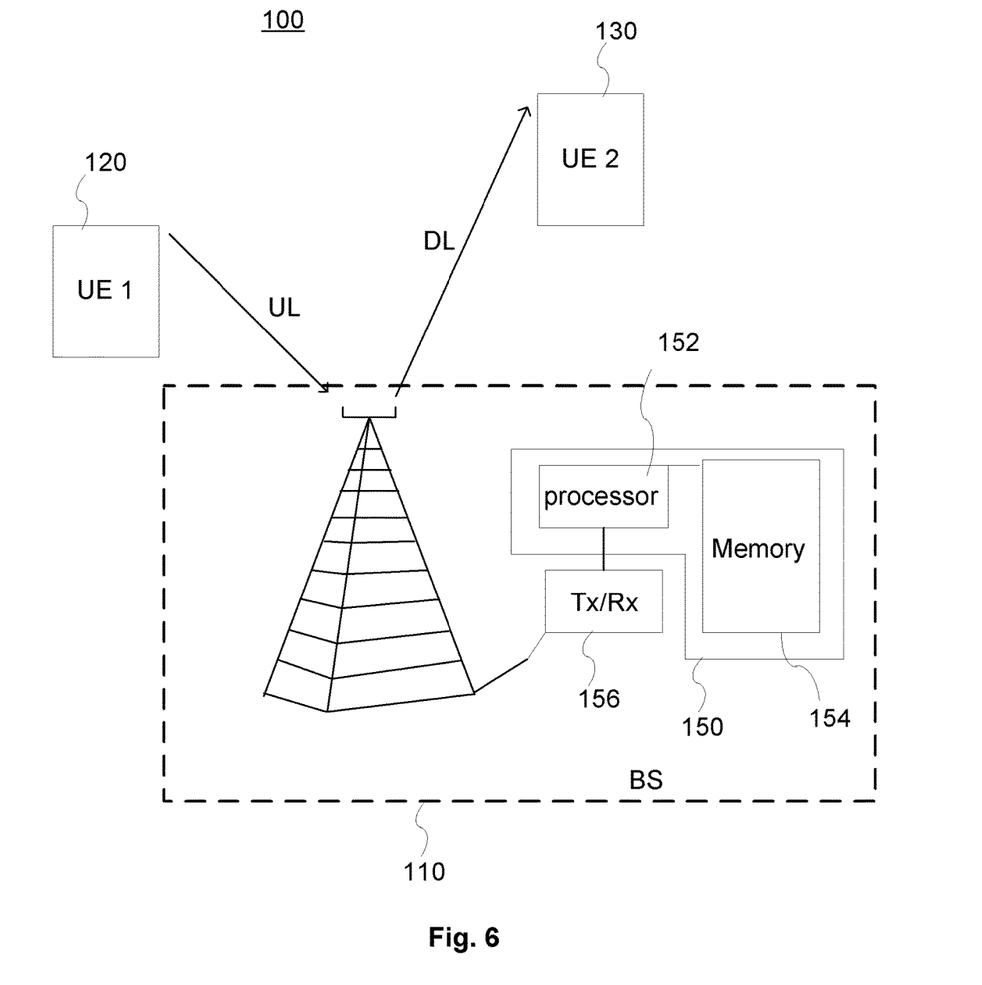
FIG. 6 is a block-diagram illustrating a network node of a wireless communications network.

FIG. 6 is a block-diagram illustrating a network node 110 of a wireless communications network 100.

The network node 110 is capable of serving a plurality of User Equipments, UEs. Each UE is a wireless device for radio communication handled by a user.

The network node 110 is further configured to provide co-scheduling of a first UE 120 and a second UE 130. The co-scheduling comprises scheduling the first UE and the second UE in a same time and frequency resource. The network node comprises a transceiver 156 for sending and receiving signalling over links between the node and each UE within its coverage area, i.e. cell. The node 110 further comprises a processing circuitry 150. The processing circuitry 150 comprises a processor 152 and a memory 154. The memory is containing instructions executable by said processor 152.

According to one embodiment, the processing circuitry 150 is operative to perform steps of the method S100, i.e.:
  determining an uplink, UL, transmitting power value for the first UE and a downlink, DL, receiving power value for the second UE;
  determining link loss information between the first and second UEs;
  deriving a co-scheduling threshold value based on the UL transmitting power value for the first UE and DL receiving power value for the second UE;
  determining if a co-scheduling condition is fulfilled, wherein the co-scheduling condition implies comparing the link loss information to the co-scheduling threshold value;
  selecting the first and second UE for co-scheduling when the co-scheduling condition is fulfilled.

The link loss information may comprise location data for the first and/or second UE.

Further, the processing circuitry 150 may be adapted to derive the location data for the first and second UE, the location data being derived from measurement on the link between the network node and the UE in question.

The processing circuitry 150 may be adapted to retrieve and determine UL transmitting power value for the first UE and DL receiving power value for the second UE from L1/RRM measurement result(s) reported by the first and second UEs.

According to one example, the processing circuitry 150 may be operative to determine UL transmitting power value for the first UE by retrieving UL transmitting power value from a power headroom report.

The processing circuitry 150 may further be adapted to retrieve the UL transmitting power value from the power headroom report and a power control command sent from the wireless communications network to the UEs.

According to other embodiments of the network node 110, the processing circuitry 150 may be adapted to retrieve the DL receiving power value for the second UE from any of a Reference Signal Received Power, Reference Signal Received Quality, or Channel-Quality Indicator measurement report.

According to yet other embodiments of the network node 110, the determining of UL transmitting power value for the first UE and DL receiving power value for the second UE are retrieved from Timing Advance and/or Direction of Arrival measurements.

The processing circuitry 150 may also be adapted to monitor continuously if the co-scheduling condition for the first and second UEs is fulfilled, and to release the co-scheduling of the first and second UE when the co-scheduling condition for the first and second UEs is fulfilled.

The processing circuitry 150 of the network node 100 may further be adapted to determine the UL transmitting power value for the first UE and the DL receiving power value for the second UE, to determine the link loss information, between the first and second UEs, said link loss information being determined based on channel measurement results between the first UE and the network node, and the second UE and the network node, and to derive the co-scheduling threshold value based on the UL transmitting power value for the first UE and DL receiving power value for the second UE.

According to yet another embodiment of the network node 110, the processing circuitry 150 may be adapted to release the co-scheduling of the first and second UE based on the reception of Negative-Acknowledgement message(s).

Figure 7:
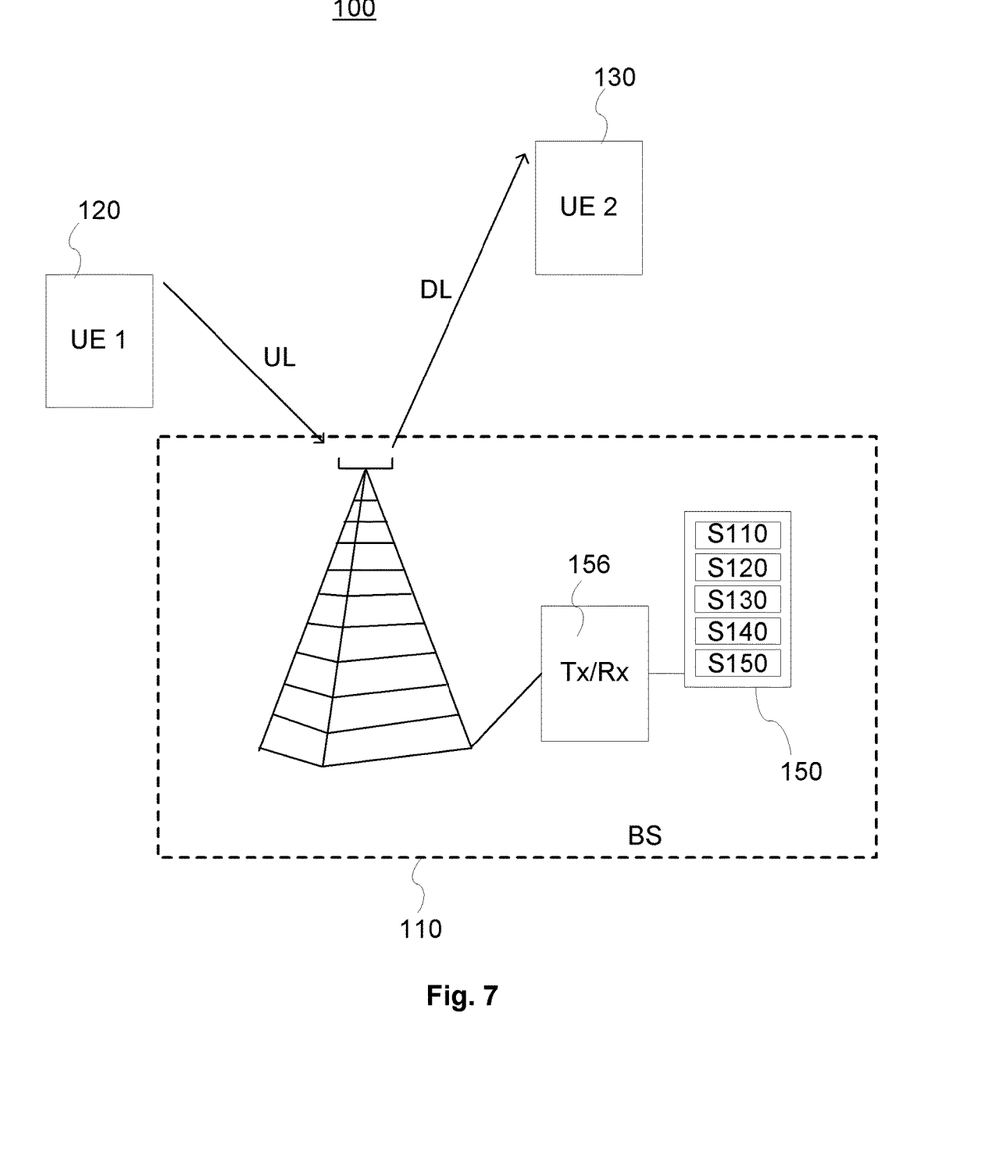
FIG. 7 is block diagram illustrating another network node of a wireless communications network.

FIG. 7 is block diagram illustrating another embodiment of a network node of a wireless communications network.

The network node 110 is configured to provide co-scheduling of a first UE 120 and a second UE 130. The co-scheduling comprises scheduling the first UE and the second UE in a same time and frequency resource. The network node 110 comprises a transceiver 156 for sending and receiving signalling over links between the node and each UE within its coverage area, i.e. cell. The node 110 further comprises a processing circuitry 150. The processing circuitry contains instructions executable by said processing circuitry 150.

According to one embodiment, the processing circuitry 150 is operative to perform steps of the method S100, i.e.:

S110: determining an uplink, UL, transmitting power value for the first UE and a downlink, DL, receiving power value for the second UE;

S120: determining link loss information between the first and second UEs;

S130: deriving a co-scheduling threshold value based on the UL transmitting power value for the first UE and DL receiving power value for the second UE;

S140: determining if a co-scheduling condition is fulfilled, wherein the co-scheduling condition implies comparing the link loss information to the co-scheduling threshold value;

S150: selecting the first and second UE for co-scheduling when the co-scheduling condition is fulfilled.

According to an example of the embodiment in FIG. 7, the network node 110 of a wireless communications network 100 is configured to serve user equipments, UEs. It is further configured to provide co-scheduling of a first 120 and the second UE 130. Co-scheduling comprises scheduling of the first UE and the second UE in a same time and frequency resource. The network node 100 comprises:

means adapted to determine an uplink, UL, transmitting power value for the first UE and a downlink, DL, receiving power value for the second UE;

means adapted to determine link loss information between the first and second UEs;

means adapted to derive a co-scheduling threshold value based on the UL transmitting power value for the first UE and DL receiving power value for the second UE;

means adapted to determine if a co-scheduling condition is fulfilled, wherein the co-scheduling condition implies comparing the link loss information to the co-scheduling threshold value; and means adapted to select the first and second UE for co-scheduling when the co-scheduling condition is fulfilled.

The link loss information may comprise location data for the first and/or second UE. The network node may further comprise means adapted to derive the location data for the first and second UE, and means adapted to derive the location data from measurement on the link between the network node and the UE in question.

The network node 110 may also comprise means adapted to retrieve and determine the UL transmitting power value for the first UE and DL receiving power value for the second UE from L1/RRM measurement result(s) reported by the first and second UEs.

The network node 110 may further comprise means adapted to determine UL transmitting power value for the first UE by retrieving UL transmitting power value from a power headroom report.

The network node 110 may also comprise means adapted to retrieve the UL transmitting power value from the power headroom report and a power control command sent from the wireless communications network to the UEs.

The network node 110 may further comprise means adapted to retrieve the DL receiving power value for the second UE from any of a Reference Signal Received Power, Reference Signal Received Quality, or Channel-Quality Indicator measurement report.

According to an example, the network node 110 may comprise means adapted to determine UL transmitting power value for the first UE and DL receiving power value for the second UE by retrieving results from Timing Advance and/or Direction of Arrival measurements.

According to further an embodiment, the network node 110 may comprise means adapted to monitor continuously if the co-scheduling condition for the first and second UEs is fulfilled, and to release the co-scheduling of the first and second UE when the co-scheduling condition for the first and second UEs is fulfilled.

Further, the network node 150 may comprise means adapted to determine the UL transmitting power value for the first UE and the DL receiving power value for the second UE, to determine the link loss information, between the first and second UEs, said link loss information being determined based on channel measurement results between the first UE and the network node, and the second UE and the network node, and to derive the co-scheduling threshold value based on the UL transmitting power value for the first UE and DL receiving power value for the second UE.

The network node 110 may also comprise means adapted to release the co-scheduling of the first and second UE based on the reception of Negative-Acknowledgement message(s).

The above described means may be implemented as processing circuitry 150 containing instructions executable by said processor, as illustrated in FIG. 7. As illustrated in FIG. 6, the processing circuitry 150 may be implemented as a processor 152 and a memory 154, said memory 154 is containing instructions executable by said processor. Said instructions may be the above described steps of the different embodiments of the method S100. The network node 110 is capable of performing said different embodiments of the method S100, when said instructions are executed by the processing circuitry 150.

The means, entities and units described above with reference to FIGS. 6 and 7 are logical units, and do not necessarily correspond to separate physical units. Thus, the person skilled in the art would appreciate that the units disclosed in the FIGS. 6 and 7 may be implemented as physically integrated units, and/or physically separate units, and that the units are provided with appropriate processing circuits.

Figure 8:
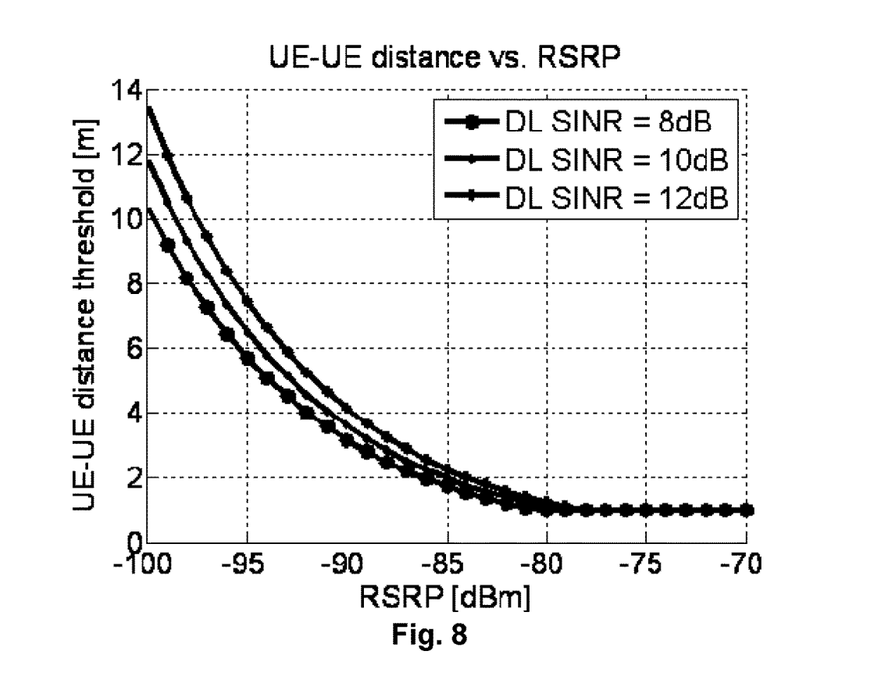
FIGS. 8 and 9 are diagram illustrating UE-UE distance vs. RSRP.
Figure 9:
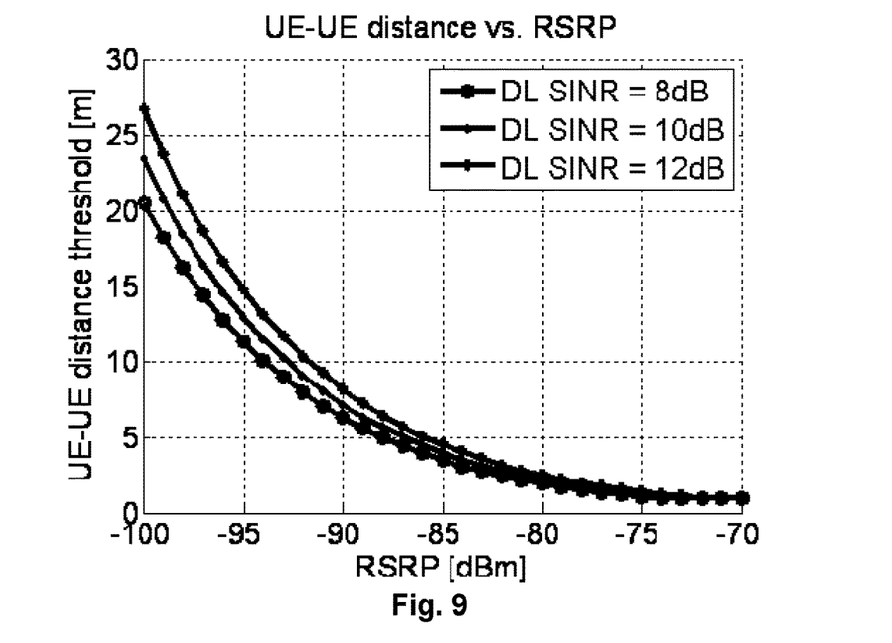

FIGS. 8 and 9 are diagram illustrating UE-UE distance vs. RSRP.

The UE to UE interference/distance threshold for co-scheduling would vary according to the UE-eNB link distance as illustrated in FIGS. 8 and 9. In the following, the required UE-UE distance is shown according to different RSRP level (as an indicator of UE-eNB distance), for 2 W eNB power in FIG. 8 and 40 W eNB power in FIG. 9.

It can be seen that at −90 dBm RSRP region, less than ~4 m UE-UE distance can provide 12 dB DL SINR in Pico cell case (left) and it increases to ~8 m in Macro cell case (right). The main setting of the simulation results are as follows:

20 MHz bandwidth, eNB power=2/40 W.
BS noise figure=3 dB, UE noise figure=7 dB;
UE UL power control SINR target=15 dB, alpha=0.8;
UE to UE path loss model: PL=40+35*log(d in m), d>1 m.

So the scheduling would be a key tool to deal with the UE-UE interference.

A number of embodiments of the present technology have been described. It will be understood that various modifications may be made without departing from the scope of this disclosure. Therefore, other implementations are within the scope of the following claims.

The invention claimed is:

1. A method for co-scheduling a first and a second user equipment (UE) wherein co-scheduling comprises scheduling the first UE and the second UE in a same time and frequency resource, the method being performed in a network node being configured to serve the first and second UE, the method comprises:
   determining an uplink (UL) transmitting power value for the first UE and a downlink (DL) receiving power value for the second UE;
   determining a link loss information, between the first and second UEs, said link loss information being determined based on channel measurement results between the first UE and the network node, and the second UE and the network node;
   deriving a co-scheduling threshold value based on the UL transmitting power value for the first UE and DL receiving power value for the second UE;
   determining whether a co-scheduling condition is fulfilled, wherein the co-scheduling condition implies comparing the link loss information to the co-scheduling threshold value;
   selecting the first and second UEs for co-scheduling when the co-scheduling condition is fulfilled.

2. The method of claim 1, wherein the link loss information comprises location data for the first and second UEs.

3. The method of claim 1, wherein the determining of UL transmitting power value for the first UE and DL receiving power value for the second UE comprises retrieving the UL transmitting power value for the first UE and the DL receiving power value for the second UE from at least one Layer 1/Radio Resource Management (L1/RRM) measurement result reported by the first and second UEs.

4. The method of claim 1, wherein the determining of UL transmitting power value for the first UE and DL receiving power value for the second UE comprises retrieving the UL transmitting power value for the first UE and the DL receiving power value for the second UE from Timing Advance and/or Direction of Arrival measurements.

5. The method of claim 1, wherein the method comprises:
   continuing to monitor whether the co-scheduling condition for the first and second UEs is fulfilled, subsequent to selecting the first and second UEs for co-scheduling;
   release the co-scheduling of the first and second UEs when the co-scheduling condition for the first and second UEs is not fulfilled.

6. The method of claim 5, wherein continuing to monitor whether the co-scheduling condition is fulfilled comprises:
   determining the UL transmitting power value for the first UE and the downlink receiving power value for the second UE;
   determining the link loss information, between the first and second UEs, said link loss information being determined based on channel measurement results between the first UE and the network node, and the second UE and the network node;
   deriving the co-scheduling threshold value based on the UL transmitting power value for the first UE and DL receiving power value for the second UE.

7. The method of claim 1, wherein the method comprises:
   release the co-scheduling of the first and second UEs based on reception of one or more Negative-Acknowledgement messages.

8. A network node of a wireless communications network, the network node being configured to serve a first and a second user equipment (UE) and to provide co-scheduling of the first UE and the second UE, wherein co-scheduling comprises scheduling the first UE and the second UE in a same time and frequency resource, the network node comprises processing circuitry operative to:
   determining an uplink (UL) transmitting power value for the first UE and a downlink (DL) receiving power value for the second UE;
   determining link loss information between the first and second UEs;
   deriving a co-scheduling threshold value based on the UL transmitting power value for the first UE and DL receiving power value for the second UE;
   determining whether a co-scheduling condition is fulfilled, wherein the co-scheduling condition implies comparing the link loss information to the co-scheduling threshold value;
   selecting the first and second UEs for co-scheduling when the co-scheduling condition is fulfilled.

9. The network node of claim 8, wherein the link loss information comprises location data for the first and/or second UE.

10. The network node of claim 8, wherein the processing circuitry is adapted to determine the UL transmitting power value for the first UE and the DL receiving power value for the second UE by retrieving the UL transmitting power value for the first UE and the DL receiving power value for the second UE from at least one L1/RRM measurement result reported by the first and second UEs.

11. The network node of claim 8, wherein the processing circuitry is adapted to determine the UL transmitting power value for the first UE and the DL receiving power value for the second UE by retrieving the UL transmitting power value for the first UE and the DL receiving power value for the second UE from Timing Advance and/or Direction of Arrival measurements.

12. The network node of claim 8, wherein the processing circuitry is adapted to continue to monitor whether the co-scheduling condition for the first and second UEs is fulfilled, subsequent to selecting the first and second UEs for co-scheduling, and to release the co-scheduling of the first and second UEs when the co-scheduling condition for the first and second UEs is not fulfilled.

13. The network node of claim 12, wherein the processing circuitry is adapted to determine the UL transmitting power value for the first UE and the DL receiving power value for the second UE, to determine the link loss information, between the first and second UEs, said link loss information being determined based on channel measurement results between the first UE and the network node, and the second UE and the network node, and to derive the co-scheduling threshold value based on the UL transmitting power value for the first UE and DL receiving power value for the second UE.

14. The network node of claim 8, wherein the processing circuitry is adapted to release the co-scheduling of the first and second UEs based on reception of one or more Negative-Acknowledgement messages.

* * * * *